(12) United States Patent
Läänemets et al.

(10) Patent No.: US 9,878,586 B2
(45) Date of Patent: Jan. 30, 2018

(54) VEHICLE WHEEL ASSEMBLY

(71) Applicant: Jaguar Land Rover Limited, Whitley Coventry, Warwickshire (GB)

(72) Inventors: Laur Läänemets, Lääne-Virumaa (EE); Emma-Claire Dunning, Coventry (GB); Kit Jones, Southam (GB); Maelle Dodu, Leamington Spa (GB); Mark Ford, Bedworth (GB); Michael Boyd, Brackley (GB); Daniel Loftus, Kineton (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/909,099

(22) PCT Filed: Jul. 30, 2014

(86) PCT No.: PCT/EP2014/066418
§ 371 (c)(1),
(2) Date: Jan. 29, 2016

(87) PCT Pub. No.: WO2015/014904
PCT Pub. Date: Feb. 5, 2015

(65) Prior Publication Data
US 2016/0167458 A1    Jun. 16, 2016

(30) Foreign Application Priority Data
Jul. 30, 2013 (GB) .................................. 1313622.1
Oct. 31, 2013 (GB) .................................. 1319208.3

(51) Int. Cl.
*B60C 23/00* (2006.01)
*B60B 1/12* (2006.01)
(Continued)

(52) U.S. Cl.
CPC .............. *B60C 23/004* (2013.01); *B60B 1/12* (2013.01); *B60C 23/003* (2013.01); *F16K 27/00* (2013.01); *F16K 31/1221* (2013.01)

(58) Field of Classification Search
CPC ..... B60C 23/004; B60C 23/003; F16K 27/00; F16K 31/1221; B60B 1/12
(Continued)

(56) References Cited

U.S. PATENT DOCUMENTS 4,685,501 A    8/1987 Williams
4,700,763 A    10/1987 Williams
(Continued)

FOREIGN PATENT DOCUMENTS

EP    1559591 A2    8/2005
WO    WO8908031 A1    9/1989
(Continued)

OTHER PUBLICATIONS

Combined Search and Examination Report corresponding to application No. GB1313622.1, dated Feb. 10, 2014, 10 pages.
(Continued)

*Primary Examiner* — S. Joseph Morano
*Assistant Examiner* — Jean Charleston
(74) *Attorney, Agent, or Firm* — Reising Ethington P.C.

(57) ABSTRACT

A vehicle wheel assembly (1) for supplying compressed air from a vehicle axle to a tire (3) comprises a vehicle wheel (5) and a control valve assembly (7). The wheel (5) comprises a wheel hub (9) for mounting the wheel (5) to a vehicle (V); and a wheel rim for mounting a tire (3) on the wheel (5). A transfer line (19) is provided in the wheel for transferring compressed air from the wheel hub to the wheel rim (11) for inflating the tire (3). The control valve assembly (7) comprises an inlet, an outlet and a control valve (25) operably located between the inlet and the outlet for con-
(Continued)

trolling passage of compressed air between the inlet and the outlet. The control valve assembly (7) is removably disposed in the wheel hub (9) such that fluid communication is established between the control valve assembly (7) and the transfer line (19).

27 Claims, 13 Drawing Sheets

(51) Int. Cl.
F16K 27/00 (2006.01)
F16K 31/122 (2006.01)

(58) Field of Classification Search
USPC ........ 152/415, 417, 427, 428; 137/223, 224, 137/226
See application file for complete search history.

(56) References Cited

U.S. PATENT DOCUMENTS

| | | | | |
|---|---|---|---|---|
| 4,895,199 | A * | 1/1990 | Magnuson | B60C 23/003 137/102 |
| 5,398,743 | A | 3/1995 | Bartos | |
| 5,429,167 | A * | 7/1995 | Jensen | B60C 23/003 152/415 |
| 5,584,949 | A | 12/1996 | Ingram | |
| 6,425,427 | B1 | 7/2002 | Stech | |
| 7,185,688 | B2 | 3/2007 | Hayes et al. | |
| 7,882,733 | B2 | 2/2011 | Isono | |
| 8,307,868 | B2 * | 11/2012 | Medley | B60C 23/003 152/415 |
| 2005/0205182 | A1 | 9/2005 | Maquaire et al. | |
| 2005/0236083 | A1 | 10/2005 | Wang et al. | |
| 2007/0204946 | A1 | 9/2007 | Medley et al. | |
| 2009/0084481 | A1 | 4/2009 | Kalavitz | |
| 2009/0095359 | A1 | 4/2009 | Campau | |
| 2009/0205764 | A1 | 8/2009 | Pionke | |
| 2010/0024940 | A1 | 2/2010 | Hobe et al. | |
| 2010/0038004 | A1 | 2/2010 | Saadat | |
| 2010/0147387 | A1 | 6/2010 | Medley et al. | |
| 2011/0221261 | A1 | 9/2011 | Eaton et al. | |
| 2012/0138826 | A1 * | 6/2012 | Morris | B60C 23/003 251/12 |
| 2014/0034202 | A1 * | 2/2014 | Voith | B60C 29/06 152/415 |
| 2015/0013866 | A1 | 1/2015 | Tanno | |

FOREIGN PATENT DOCUMENTS

| | | |
|---|---|---|
| WO | WO2008081621 A1 | 7/2008 |
| WO | WO2012084912 A1 | 6/2012 |
| WO | WO2013125409 A1 | 8/2013 |

OTHER PUBLICATIONS

Combined Search and Examination Report corresponding to application No. GB1319208.3, dated May 20, 2014, 10 pages.
International Search Report corresponding to International application No. PCT/EP2014/066418, dated Oct. 16, 2014, 3 pages.
Written Opinion corresponding to International application No. PCT/EP2014/066418, dated Oct. 16, 2014, 6 pages.
Further Search Report relating to claim 32 corresponding to application No. GB1319208.3, dated Jan. 22, 2015, 2 pages.
Further Search Report relating to claims 20 to 31 corresponding to application No. GB1319208.3, dated Jan. 22, 2015, 2 pages.
Further Search Report relating to claim 33 corresponding to application No. GB1319208.3, dated Jan. 23, 2015, 2 pages.
Combined Search and Examination Report corresponding to application No. GB1519870.8, dated Jan. 8, 2016, 4 pages.

* cited by examiner

VEHICLE WHEEL ASSEMBLY

TECHNICAL FIELD

The present disclosure relates to a vehicle wheel assembly and in particular, but not exclusively, to a vehicle wheel assembly for delivering compressed air from a vehicle axle to a tyre. Aspects of the present invention relate to a vehicle wheel; to a control valve assembly; to a central tyre inflation system (CTIS); to a vehicle; and to a method.

BACKGROUND OF THE INVENTION

The present invention was conceived in the context of central tyre inflation systems (CTIS). CTIS were originally developed for military applications, in particular off-road military wheeled trucks and trailers. However, CTIS are nowadays incorporated into non-military vehicles such as specialist construction and commercial vehicles.

CTIS comprise one or more compressed air sources located on-board the vehicle and connected to one or more tyres. Tyre pressure can therefore be adjusted by the CTIS. Typically, CTIS provide for delivery of compressed air to a tyre through a vehicle's axle. Accordingly, there are vehicle wheels and vehicle wheel assemblies designed to receive incoming flow of compressed air from the axle, and to deliver it to the tyre.

U.S. Pat. No. 6,425,427 B1 discloses an on-axle tyre inflation system.

US 2005/0236083 A1 discloses a vehicle wheel assembly comprising a rim secured to a wheel hub and a tyre secured to the rim, with a hollow stud having an air conduit. The hollow stud extends through a rim opening and has a first end secured to the hub. A lug nut is secured to the hollow stud at a second end. The first end is operably connected to a source of compressed air through the air conduit. A central tyre inflation valve is secured to the rim. The rim includes a first internal conduit communicating with the air conduit and the valve, and a second internal conduit communicating with the valve and the interior of the tyre.

Drawbacks of the known systems include their adverse effect on wheel styling (which is not typically a concern with trucks but may not be aesthetically acceptable for passenger vehicles), their bulkiness and heaviness.

It is against this background that the present invention has been conceived. At least in certain embodiments, the present invention seeks to address shortcomings associated with the prior art or to improve parts, apparatus, systems and methods disclosed in the prior art.

SUMMARY OF THE INVENTION

Aspects of the present invention relate to a vehicle wheel assembly; a vehicle wheel; a control valve assembly; a central tyre inflation system; a vehicle; and a method.

According to an aspect of the present invention, there is provided a vehicle wheel assembly for supplying compressed air to a tyre, the vehicle wheel assembly comprising a wheel and a control valve assembly, the wheel comprising:
a wheel hub for mounting the wheel to a vehicle;
a wheel rim for mounting a tyre on the wheel; and
a transfer line for supplying compressed air to a tyre if the tyre is mounted on the wheel;
the control valve assembly comprising:
an inlet for receiving compressed air from a supply line;
an outlet for supplying compressed air to the transfer line; and
a control valve for selectively placing the inlet in fluid communication with the outlet;
wherein the control valve assembly is removably disposed in the wheel hub.

The control valve assembly can control or regulate the supply of compressed air to control inflation and/or deflation of the tyre. The control valve assembly can be removed from the wheel assembly to allow, or at least facilitate, maintenance and repair of the wheel and/or the tyre. For example, the control valve assembly can be removed from the wheel hub to replace the tyre and/or balance the wheel assembly. In use, the control valve assembly can rotate in unison with the vehicle wheel. The control valve assembly can be configured to be mounted in the wheel hub such that, in use, the control valve assembly rotates together with the wheel hub. The control valve assembly can be mounted substantially coaxially, or coaxially, in the wheel hub.

For the avoidance of doubt, the wheel hub is intended herein to be a portion of the wheel as opposed to a vehicle wheel hub which is instead a portion of a vehicle axle. The vehicle wheel hub can comprise threaded studs for mounting the wheel thereto.

A wheel hub cavity can be formed in the wheel hub. The control valve assembly can be partially or completely disposed within the wheel hub cavity. In use, the control valve assembly can be disposed partially or completely within the wheel hub cavity. The wheel hub cavity can comprise a cylindrical section having a longitudinal axis arranged substantially coincident with a rotational axis of the wheel. The wheel hub cavity can extend partially or completely through the wheel hub.

The wheel can additionally comprise a wheel valve operable to open/close the transfer line. The wheel valve can be disposed within the transfer line. The wheel valve can be provided at a radially inner end of the transfer line, for example at or proximal to the wheel hub; or at a radially outer end of the transfer line, for example at or proximal to the wheel rim. Alternatively, the wheel valve can be provided at an intermediate position along the transfer line. The wheel valve can be operable to control the flow of compressed air to and/or from the tyre, for example selectively to permit/inhibit flow. The wheel valve could also regulate flow through the transfer line. A variety of valves known in the art can be used for this purpose, e.g. a pneumatic check valve.

The wheel valve can comprise a first valve member which is movable between an open position and a closed position. The first valve member can be movable along a first axis. The first axis can be defined by the valve and/or by the valve member. The first axis can be arranged radially relative to a rotational axis of the wheel. Alternatively, the first axis can be arranged substantially parallel to, or substantially coincident with the rotational axis of the wheel.

The wheel valve can be configured to close when the control valve assembly is removed from the wheel hub. The venting of air from the tyre can thereby be inhibited upon removal of the control valve assembly. In use, the air pressure in the tyre can exert a force on the wheel valve to displace the first valve member to its closed position. This pressure force could be relied on to displace the first valve member to its closed position. Alternatively, the wheel valve can comprise a biasing means to bias the first valve member towards its closed position. The biasing means can comprise a spring, such as a coil spring, or other resilient member.

The control valve assembly can cooperate with the wheel valve to displace the first valve member to its open position. For example, the control valve assembly can be adapted to displace the first valve member to its open position when the control valve assembly is disposed in the wheel hub. The first valve member can be configured to return to its closed position when the control valve assembly is removed from the wheel hub, for example in dependence on the force applied by the biasing means and/or the air pressure in the tyre. If more than one wheel valve is provided, two or more wheel valves can be opened simultaneously when the control valve assembly is disposed within the wheel hub.

The wheel assembly can be suitable for mounting to a vehicle hub mounting member forming part of the vehicle wheel hub disposed on the vehicle. The vehicle hub mounting member can be in the form of a plate or a flange. A plurality of threaded studs can be provided on said vehicle hub mounting member for fixedly mounting the wheel assembly. The wheel valve can be configured to cooperate with the vehicle hub mounting member. The wheel valve can be configured to open when the wheel hub is mounted to the vehicle hub mounting member. Alternatively, or in addition, the wheel valve can be configured to close when the wheel hub is removed from the vehicle hub mounting member. The wheel valve can comprise a first valve member which is displaced to an open position when the wheel hub is mounted to the hub mounting member. At least in certain arrangements, the control valve assembly can be fitted to and/or removed from the wheel assembly without operating the wheel valve.

The wheel valve can comprise means for displacing the first valve member to its open position. The displacement means can comprise a member, such as a pin or arm, coupled to the valve member. The control valve assembly or the vehicle hub mounting member can cooperate with the displacement means to open the wheel valve. The displacement means can protrude for engagement with the control valve assembly or the vehicle hub mounting member. For example, the wheel hub cavity can have a longitudinally stepped profile defining a transverse surface from which the displacement means protrudes. The control valve assembly can comprise a closure member for engaging said displacement means. A projection, such as an annular flange, may be provided on said closure member for engaging said displacement means. The displacement means can project beyond a wheel mating surface formed on said wheel hub. In use, the displacement means can cooperate with a face of the vehicle hub mounting member to open/close the wheel valve.

In some embodiments, two or more wheel valves can be provided. One or more wheel valves can each be associated with a respective transfer line. One or more wheel valves can be provided in or on the wheel rim, in a conventional manner. Any wheel valves provided on the wheel rim can each be referred to as rim wheel valve. The wheel valve(s) and/or any rim wheel valves can be arranged as one or more pairs located on the wheel hub at diametrically opposed locations with respect to the rotational axis of the wheel. Wheel valves and/or rim wheel valves located opposite to each other can be configured to rotationally balance each other.

The wheel assembly can comprise a rim wheel valve, optionally in the form of a Schrader valve, for additionally inflating and/or deflating the tyre conventionally. The rim wheel valve can, for example, be disposed in or on the wheel rim in conventional manner. In an arrangement, the wheel valve can be disposed diametrically opposite the rim wheel valve, which can be a Schrader valve.

The control valve assembly can comprise a second valve member movable between an open position and a closed position. The second valve member can be movable along a second axis. The second axis can be defined by the control valve assembly and/or by the second valve member. The second axis can be arranged substantially parallel to, or substantially coincident with a rotational axis of the wheel.

The wheel has lateral inner and outer sides. When the wheel assembly is mounted to the vehicle, the inner side is directed inwardly towards the vehicle; and the outer side is directed outwardly away from the vehicle. The wheel hub cavity may open towards the outer side for receiving the control valve assembly from the outer side of the wheel. Alternatively, the wheel hub cavity can open towards the inner side for receiving the control valve assembly from the inner side of the wheel. In this arrangement, the control valve assembly can be installed within the wheel hub from the inner side of the wheel. In use, the vehicle wheel assembly is mounted to a vehicle hub and the control valve assembly is disposed between the wheel hub and the vehicle hub. The control valve assembly can be fixedly mounted between the wheel hub and the vehicle hub such that the control valve assembly can only be removed from the wheel if the wheel is first removed from the vehicle. The wheel hub cavity can be closed to the outer side of the wheel or can be adapted to prevent the control valve assembly being installed from the outer side.

The wheel hub cavity and the control valve assembly can have cooperating or matching longitudinal profiles. The wheel hub cavity and the control valve assembly can have cooperating cylindrical surfaces. The control valve assembly can thus be disposed within the wheel hub in any angular position (relative to the rotational axis of the wheel). Alternatively, the cavity and the control valve can have corresponding registration features, such as corresponding longitudinal slots and protrusions, so that the control valve assembly can only be disposed within the wheel hub according to one or more predetermined angular positions.

The wheel hub cavity and/or the control valve assembly can be profiled to permit insertion (and removal) of the control valve assembly into the wheel hub cavity only from one side of the wheel, for example from the inner side of the wheel. The wheel hub cavity and/or the control valve assembly can comprise a stepped or a tapered profile. Alternatively, or in addition, the wheel hub cavity and/or the control valve assembly can comprise axial retaining means for retaining the control valve assembly within the wheel hub cavity. The axial retaining means could, for example, comprise one or more retaining flanges or projections. A mechanical fastener, such as a circlip (C-clip), could optionally be provided to retain the control valve assembly in position.

A sealed volume can be formed between the control valve assembly and the wheel hub. The sealed volume can be fluidly sealed by sealing means, for example O-rings, mounted to the wheel hub cavity and/or the control valve assembly, or by mating sealing surfaces provided on the wheel hub cavity and/or the control valve assembly. The sealed volume can form a first annular cavity or chamber provided around the control valve assembly. The control valve assembly can maintain fluid communication between the control valve assembly and the transfer line irrespective of the angular orientation of the control valve assembly within the wheel hub cavity.

At least one securing means can be provided to allow the control valve assembly to be releasably secured to the wheel hub. In some embodiments, the securing means is located on the control valve assembly. The control valve assembly can comprise a locating flange. The closure member can, for example, form the locating flange. One or more clips can be mounted on said locating flange to provide the securing means. A radial spring can be provided to bias the clips radially outwardly. A user can apply a force to radially retract the clips so that the locating flange can be disposed in the wheel hub cavity. To register the control valve assembly in place in the wheel hub, the clips can locate in a recess in a sidewall of the wheel hub cavity. The recess can be an annular groove. In some embodiments, the control valve assembly can be registered at a predetermined axial location by the securing means.

The control valve can be a pneumatically actuated control valve. Alternative embodiments wherein the control valve is an electrically or electromechanically actuated control valve are also envisaged. The control valve can be a latching valve.

The wheel can comprise a plurality of spokes. The transfer line can be formed in one of said spokes. Alternatively, the transfer line could be a separate conduit or tube, for example disposed on the inside of the wheel behind one of the spokes.

According to a further aspect of the present invention there is provided a central tyre inflation system (CTIS) comprising a vehicle wheel assembly as described herein. The CTIS can comprise a supply line for supplying compressed air from a compressor to the control valve assembly. The supply line can be disposed in a drive shaft for delivering torque to the wheel. For example, the supply line can extend axially within the drive shaft. This arrangement can be referred to as a through-axle CTIS.

According to yet a further aspect of the present invention, there is provided a motor vehicle comprising a CTIS as described herein. It will be understood that one or more conventional wheels can be mounted to a vehicle equipped with a CTIS in accordance with the present invention. However, the CTIS will only inflate/deflate tyres mounted on wheel assemblies as described herein.

According to yet a further aspect of the present invention there is provided a vehicle wheel comprising:
  a wheel hub for mounting the wheel to a vehicle;
  a wheel rim for mounting a tyre on the wheel; and
  a transfer line for supplying compressed air to a tyre if the tyre is mounted on the wheel;
  wherein said wheel hub is configured removably to receive a control valve assembly. The wheel hub is adapted to establish fluid communication between the control valve assembly and the transfer line when the control valve assembly is received within the wheel hub. The vehicle wheel can be fitted to a vehicle not equipped with a CTIS and function as a conventional wheel.

The wheel hub can comprise a cavity for receiving the control valve assembly. The wheel hub cavity can extend partially or completely through the wheel hub. The wheel hub can extend substantially coaxially or co-axially with a rotational axis of the wheel. The wheel hub cavity can open to the inner side of the wheel for receiving the control valve assembly from the inner side of the wheel. Alternatively, the wheel hub cavity can open to the outer side of the wheel for receiving the control valve assembly from the outer side of the wheel. In a further alternative, the wheel hub could be configured to receive the control valve assembly from both the inner side and the outer side of the wheel.

The transfer line can be formed in a hollow spoke connecting the wheel hub and the rim. The hollow spoke can be in fluid communication at one end thereof with a wheel hub opening, and at the other end thereof with a rim opening. Compressed air can thus be delivered to an interior of the tyre from the axle through the hollow spoke. The transfer line can be machined in the hollow spoke or can be formed during a casting process. Alternatively, the transfer line can comprise an inset tube or a tube running along a spoke.

The vehicle wheel can be suitable for mounting to a vehicle hub mounting member. A wheel valve can be provided for controlling fluid flow through the transfer line. The wheel valve can be configured to cooperate with the vehicle hub mounting member. The wheel valve can be configured to open when the wheel hub is mounted to the vehicle hub mounting member. Alternatively, or in addition, the wheel valve can be configured to close when the wheel hub is removed from the vehicle hub mounting member. The wheel valve can comprise a first valve member which is displaced to an open position when the wheel hub is mounted to the hub mounting member. At least in certain arrangements, the control valve assembly can be fitted to and/or removed from the vehicle wheel without operating the wheel valve.

According to yet a further aspect of the present invention, there is provided a control valve assembly comprising:
  an inlet for receiving compressed air from a supply line;
  an outlet for supplying compressed air to a transfer line; and
  a control valve for selectively placing the inlet in fluid communication with the outlet;
  wherein the control valve assembly is configured to be removably disposed in a wheel hub. When the control valve assembly is disposed within the wheel hub, fluid communication can be established between the control valve assembly and a transfer line on the wheel. The control valve assembly can comprise a member for cooperating with a wheel valve provided in the wheel. Alternatively, the wheel valve can be arranged to cooperate with a hub mounting member to which the wheel assembly is mounted. The control valve assembly can comprise a cylindrical sidewall for positioning inside a cylindrical cavity in the wheel hub. The cylindrical sidewall can comprise a longitudinal axis for alignment at least substantially with a rotational axis of the wheel.

The control valve can comprise a valve member movable between an open position and a closed position. The valve member can be movable along a longitudinal axis. The longitudinal axis can be defined by the control valve and/or by the valve member. In use, the longitudinal axis can be arranged substantially co-axially with a rotational axis of the wheel.

The control valve assembly can comprise a housing in which the control valve is mounted. The housing can comprise first and second members, for example a base member and a closure member. The control valve assembly can comprise a nozzle for coupling to the supply line. The supply line can, for example, be provided in a drive shaft for delivering torque to the wheel. The nozzle can be connected and/or connectable to the housing, for example to the closure member thereof. The nozzle can be made of a resilient material, for example a plastics polymer, an elastomer or rubber, and can be configured for push-fitting to the housing. The nozzle can have a surface adapted for sealingly engaging a corresponding surface on the vehicle's axle. The surface of the nozzle can be conical or frustoconical.

The control valve may be electromechanically actuated, for example by a solenoid. A wireless receiver and a power source, such as a battery, may be provided in the control valve assembly for actuating the control valve. Alternatively, the control valve can be a pneumatically actuated control valve. The control valve can be a latching valve.

According to yet a further aspect of the present invention, there is provided a control valve assembly comprising:
an inlet for receiving compressed air from a supply line;
an outlet for supplying compressed air to a transfer line; and
a control valve for selectively placing the inlet in fluid communication with the outlet;
wherein the control valve comprises a valve member movable between an open position and a closed position along a longitudinal axis, and wherein, in use, the longitudinal axis is arranged substantially co-axially with a rotational axis of a wheel.

According to yet a further aspect of the present invention, there is provided a control valve assembly comprising:
an inlet nozzle for receiving compressed air from a supply line, said inlet nozzle having a frusto-conical shape;
an outlet for supplying compressed air to a transfer line; and
a control valve for selectively placing the inlet in fluid communication with the outlet.

The inlet nozzle can be made of a resilient and/or compliant material. Said material can be a rubber. The nozzle can be removably mounted to the housing.

The present invention also relates to a vehicle wheel as described herein in combination with a control valve assembly as described herein. A tyre may be mounted on the vehicle wheel. A tyre pressure monitoring system (TPMS) sensor may be provided on the rim of the wheel. The TPMS sensor may be disposed within a tyre cavity defined by the tyre and the wheel rim when the tyre is mounted on the wheel so that the tyre can accept compressed air.

According to a yet further aspect of the present invention, there is provided a method of assembling a wheel hub assembly comprising the steps of:
providing a vehicle wheel as described herein;
providing a control valve assembly as described herein; and
disposing the control valve assembly in the wheel hub such that fluid communication is established between the control valve assembly and the transfer line.

According to yet a further aspect of the present invention, there is provided a method of inflating a tyre comprising the steps of:
providing a vehicle wheel comprising a tyre as described herein; and
using at least one wheel valve, inflating the tyre.

According to a still further aspect of the present invention, there is provided a vehicle wheel comprising:
a wheel hub for mounting the wheel to a vehicle;
a wheel rim for mounting a tyre on the wheel;
a transfer line for supplying compressed air to a tyre if the tyre is mounted on the wheel; and
a wheel valve comprising a valve member movable between an open position for permitting the flow of air through the transfer line and a closed position for inhibiting the flow of air through the transfer line;
wherein the valve member is displaced to said open position when a control valve assembly is coupled to the vehicle wheel. The wheel valve can comprise actuating means, such as an arm or pin, for displacing the valve member to said open position.

In the present invention, therefore, a compressed air path for inflating a tyre is defined when a control valve assembly is disposed in a wheel. The air path runs first through the inlet, through the control valve and through the outlet of the control valve assembly, and from there through a transfer line of the wheel which is configured for inflating the tyre.

The skilled person will appreciate that the same air path can be used for deflating the tyre. The control valve assembly can operate to control inflation or deflation of the tyre depending on the pressure difference between the pressure in the supply line and the pressure in the tyre.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

Figure 1:
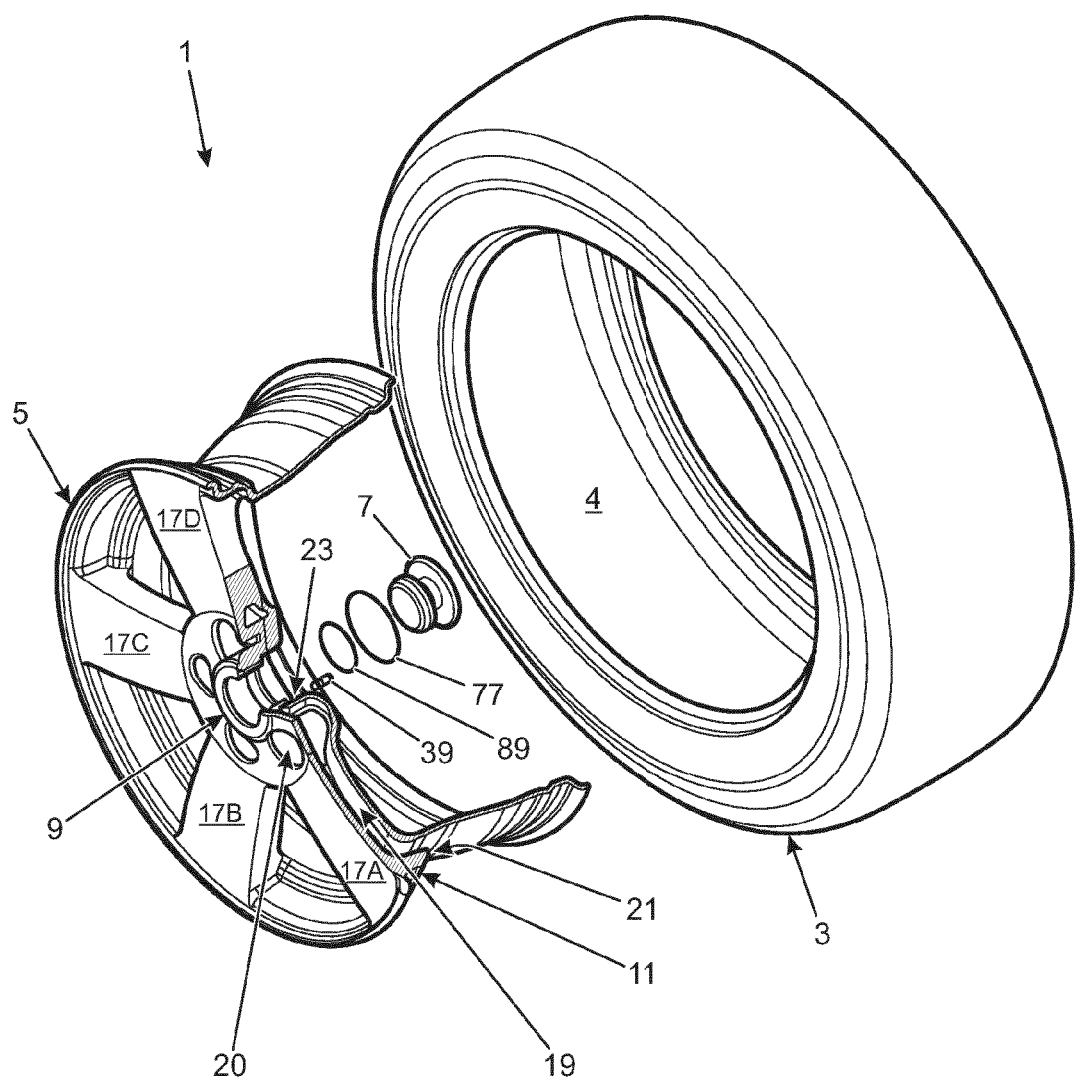
FIG. 1 is an exploded perspective view of a vehicle wheel assembly according to an embodiment of the present invention.

A vehicle wheel assembly 1 in accordance with a first embodiment of the present invention for application in a motor vehicle V will now be described with reference to the accompanying Figures. The vehicle wheel assembly 1 forms part of a central tyre inflation system (CTIS) for controlling the pressure of a tyre 3. The vehicle wheel assembly 1 can be implemented in a range of motor vehicles, including cars, off-road vehicles, sports utility vehicles (SUVs), trucks, buses and so on.

The vehicle wheel assembly 1 comprises a wheel 5 and a control valve assembly 7. The wheel 5 comprises a wheel hub 9, a wheel rim 11 and a plurality of spokes 17A-E (one of the spokes 17E has not been shown for clarity) which connect the wheel rim 11 to the wheel hub 9. The tyre 3 locates on the wheel rim 11 in conventional manner. The control valve assembly 7 is removably disposed within the wheel hub 9 and is in fluid communication with a compressed air supply in the form of a compressor C and/or a reservoir (not shown) provided on the vehicle. In the present embodiment, fluid communication with the compressed air supply is established through a supply line 13 extending along a central axis of a drive shaft 15 (shown in FIG. 6). In use, the control valve assembly 7 is operable selectively to open and close the fluid connection between the supply line 13 and the tyre 3.

The wheel 5 is made of a metallic alloy, such as aluminium or magnesium, and is of a type generally used in automotive vehicles. The wheel 5 has five spokes 17A-E, but can have less than or more than five spokes 17. A first spoke 17A is hollow and comprises a transfer line 19 extending radially outwardly from the wheel hub 9 to the rim 11. A first end of the transfer line 19 communicates with a radially outer opening 21 disposed on the rim 11 and through which the tyre can be inflated/deflated; and a second end of the transfer line 19 communicates with a radially inner opening 23 disposed on the wheel hub 9. The radially outer opening 21 opens into an interior of the tyre 3 such that a fluid pathway is established between the supply line 13 and the interior of the tyre 3. The transfer line 19 could be machined in the first spoke 17A, but in the present embodiment it is formed during the casting process. The other spokes 17B-E can also be hollow to help balance the wheel assembly 1.

Figure 2:
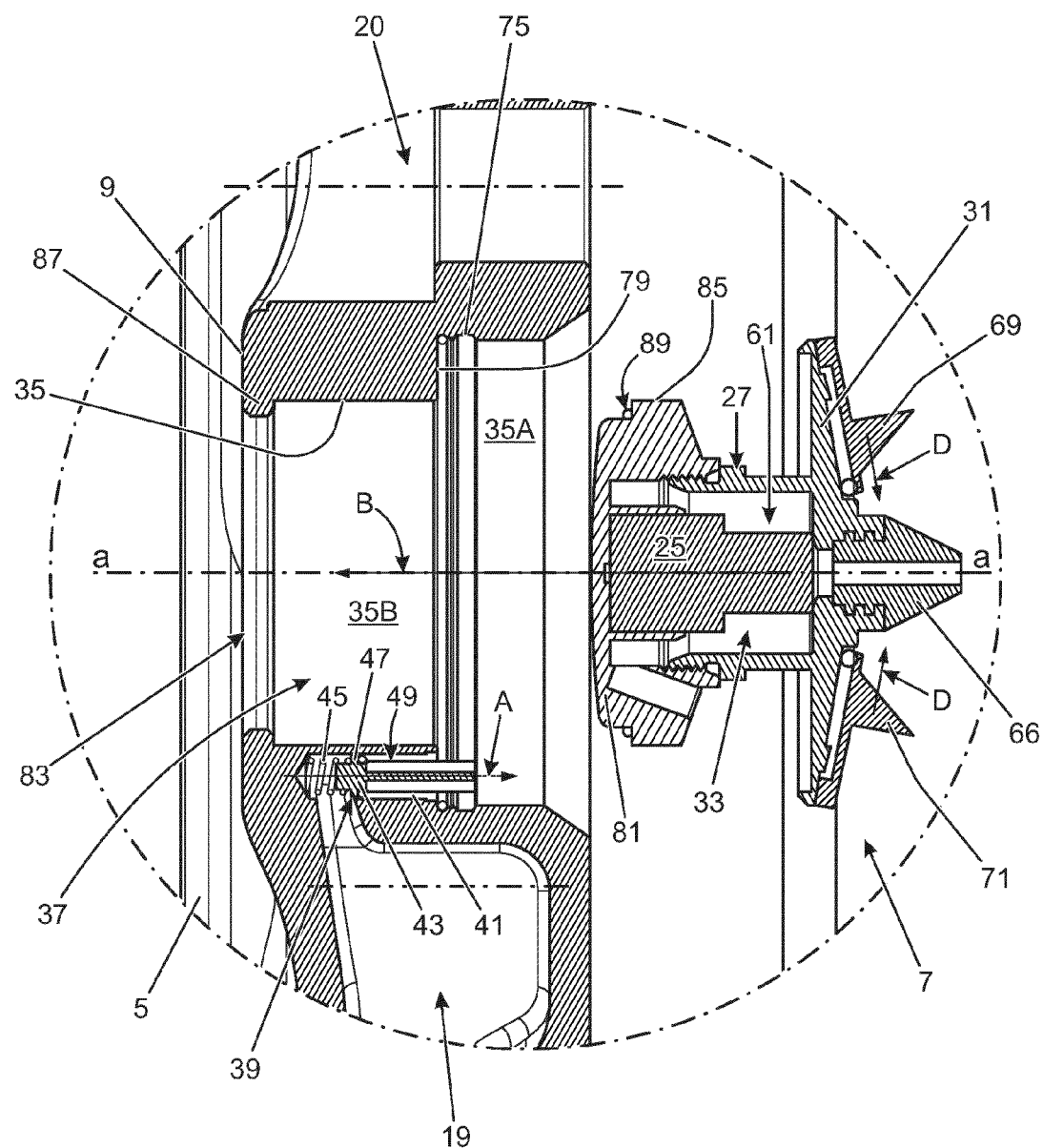
FIG. 2 is a sectional view of the wheel hub with a control valve assembly shown in withdrawn position relative to the wheel hub.
Figure 3:
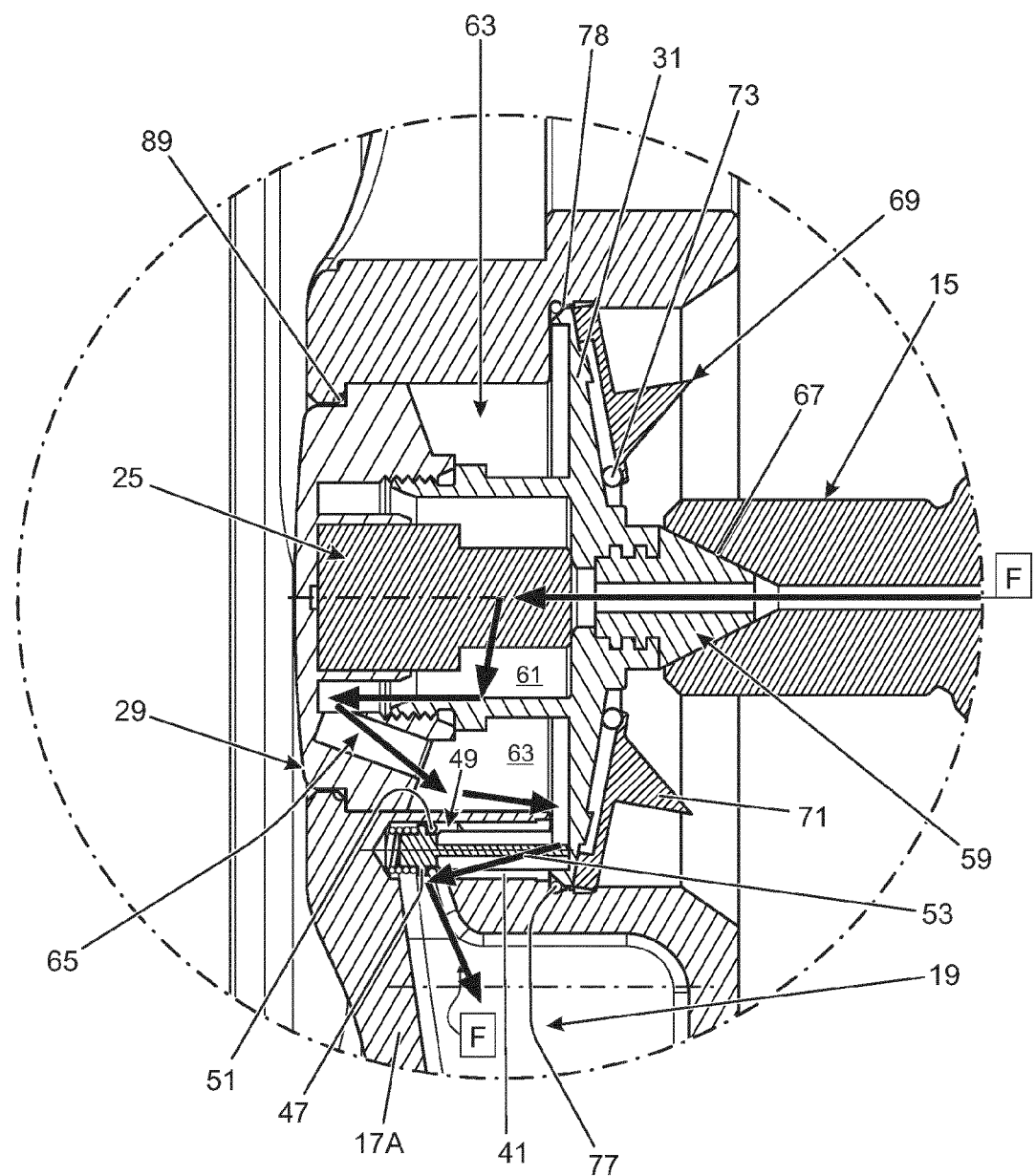
FIG. 3 is a cross sectional view of the wheel hub with the control valve assembly installed.

The control valve assembly 7 comprises a control valve 25 mounted in a housing 27. FIGS. 2 and 3 show in detail the housing 27, which housing 27 comprises a base member 29 and a closure member 31 which are threadedly connected to form a valve chamber 33 in which the control valve 25 is located, as shown in FIG. 2. The wheel hub 9 is adapted to receive the control valve assembly 7. Specifically, the wheel hub 9 comprises a stepped cylindrical sidewall 35, arranged co-axially with a rotational axis a-a of the wheel 5, which forms a central cavity 37 in which the control valve assembly 7 is removably mounted. As described herein, the wheel assembly 1 is assembled by locating the control valve assembly 7 in the central cavity 37. The wheel assembly 1 can then be mounted to the vehicle V in conventional manner by means of threaded studs and nuts or wheel bolts (not shown) fixedly mounted to a vehicle hub (not shown). The bolts extend through bores 20 formed in the wheel hub 9 and the wheel assembly 1 is secured by e.g. wheel nuts, as appropriate. In use, the control valve assembly 7 is fixedly mounted in position between the wheel hub 9 and the vehicle hub.

A wheel valve 39 is provided for sealingly closing the transfer line 19 in the first spoke 17A when the control valve assembly 7 is removed from the wheel hub 9. In the present embodiment, the wheel valve 39 is disposed at the radially inner opening 23 of the transfer line 19, but it could be disposed along the length of the transfer line 19 or at the radially outer opening 21. The wheel valve 39 comprises a fixed sleeve 41, a movable valve member 43, and a resilient biasing means in the form of a coil spring 45. The valve member 43 has a valve head 47 for cooperating with a valve seat 49 formed in the sleeve 41. The valve member 43 is movable between a closed position (shown in FIG. 2) in which the valve head 47 is seated in the valve seat 49; and an open position (shown in FIG. 3) in which the valve head 47 is spaced apart from the valve seat 49 (i.e. unseated). The valve member 43 is movable along an axis arranged substantially parallel to the central rotational axis a-a of the wheel 5 to minimise operational loads, for example centripetal forces as the wheel 5 rotates.

A first O-ring 51 is provided around the valve head 47 for forming a seal between the valve seat 49 and the valve member 43. When the valve member 43 is in its closed position, the wheel valve 39 is closed and the supply of air to the tyre 3 and/or the exhausting of air from the tyre 3 through the transfer line 19 formed in the first spoke 17A is inhibited. The spring 45 biases the valve member 43 towards its closed position, as illustrated by a first arrow A shown in FIG. 2.

Displacement means in the form of a pin 53 is coupled to the valve head 47 to cooperate with the control valve assembly 7 and displace the valve member 43 to its open position. Specifically, when the control valve assembly 7 is mounted in the wheel hub 9, the closure member 31 engages the pin 53 and displaces the valve member 43 to its open position, as shown in FIG. 3. When the valve member 43 is in its open position, the wheel valve 39 is open and the supply of air to the tyre 3 and/or the exhausting of air from the tyre 3 through the first spoke 17A is permitted. The direction of flow through the valve member 43 is dependent on the relative pressures in the supply line 13 and the tyre 3. It will be appreciated that fluid communication between the control valve assembly 7 and an interior of the tyre 3 is established when the control valve assembly 7 is mounted to the wheel hub 9.

In the present embodiment, the control valve 25 is a pneumatic latching valve which can be selectively opened and closed in response to the application of control pressures. A suitable pneumatic latching valve is available from Norgren Limited of PO Box 22, Eastern Avenue, Lichfield, Staffs, WS13 6SB, UK. The control valve 25 has an axial inlet port 55 and a radial outlet port 57. A frusto-conical nozzle 59 is mounted to the inlet port 55 (shown in FIGS. 4A-D) for sealingly engaging the drive shaft 15 and establishing fluid connection with the supply line 13. The outlet port 57 is in fluid communication with the transfer line 19 formed in the first spoke 17A via the wheel valve 39. The control valve 25 can be selectively opened and closed to control the flow of compressed air between the inlet port 55 and the outlet port 57. The operation of the control valve 25 is described in more detail herein with reference to FIGS. 4A to 4D.

The control valve 25 is disposed centrally within the valve chamber 33 formed by the base member 29 and the closure member 31. A first annular chamber 61 is formed within the housing 27, extending circumferentially around the control valve 25 to maintain fluid communication with the outlet port 57 irrespective of the angular orientation of the control valve 25. A second annular chamber 63 is formed between the housing 27 and the wheel hub 9 to ensure that fluid communication with the transfer line 19 in the first spoke 17A is maintained irrespective of the angular orientation of the control valve assembly 7. The first and second annular chambers 61, 63 are arranged concentrically about the rotational axis a-a in the present embodiment. An offset bore 65 is formed in the base member 29 to establish fluid communication between the first and second annular chambers 61, 63. The wheel valve 39 opens into the second annular chamber 63, thereby establishing fluid communication between the supply line 13 and the first spoke 17A when the wheel valve 39 and the control valve 25 are open.

The nozzle 59 is formed from a resilient material, such as rubber, and has a frusto-conical outer surface 66 for sealingly engaging a cooperating inner surface 67 formed in the drive shaft 15. Said drive shaft inner surface could be cylindrical and could comprises a thread for engagement with a corresponding thread provided on a corresponding cylindrical outer surface of a stub axle fluid connector. This stub axle fluid connector can be substantially in the form of a bolt having a head configured to engage with the frustoconical outer surface 66 of the nozzle 59. Said fluid connector can therefore threadedly engage with the cylindrical drive shaft inner surface at one end. At the other end, the fluid connector can receive the frusto-conical outer surface 66 of the nozzle 59 by means of a frusto-conical passageway formed in the head.

A pair of retaining clips 69, 71 is mounted to the closure member 31 for releasably fixing the control valve assembly 7 within the wheel hub 9. A radial spring 73 is provided to bias the clips 69, 71 radially outwardly to engage a first annular recess 75 formed in the cylindrical sidewall 35 of the hub 9. A second O-ring 77 is provided for forming a seal between the closure member 31 and the wheel hub 9. The second O-ring 77 locates in a second annular recess 78 formed in the cylindrical sidewall 35.

The control valve assembly 7 is removably mounted in the hub cavity 37 from an inside of the vehicle wheel assembly 1, as illustrated by a second arrow B in FIG. 2. A longitudinal axis of the control valve assembly 7 is arranged coaxially with the rotational axis a-a of the wheel 5. The cylindrical sidewall 35 comprises an inner cylindrical section 35A for accommodating the closure member 31 and an outer cylindrical section 35B for accommodating the base member 29. The inner and outer cylindrical sections 35A, 35B are arranged co-axially and offset relative to each other along said axis. The inner cylindrical section 35A has a larger diameter than the outer cylindrical section 35B. Further, the inner and outer cylindrical sections 35A, 35B share the same centreline, which corresponds, in this example, to the centreline of the wheel and the wheel hub. A radial surface 79 is formed in the cylindrical sidewall 35 to delimit the inner and outer cylindrical sections 35A, 35B.

A circular locating member 81 disposed at the end of the base member 29 locates in a circular aperture 83 formed in the hub 9. The locating member 81 extends through the hub 9 to the outer side of the wheel assembly 1. An annular flange 85, formed around the circular locating member 81, cooperates with an axial retaining means in the form an annular projection 87 formed in the wheel hub 9. A third O-ring 89 is mounted to the base member 29 to form a seal between the annular flange 85 and the annular projection 87.

The control valve assembly 7 is removably mounted within the hub cavity 37. When the control valve assembly 7 is located in the wheel hub 9, the locating member 81 is disposed within the circular aperture 83. When installed at a prescribed axial location within the wheel hub 9, the closure member 31 engages the pin 53 of the wheel valve 39, thereby displacing the valve member 43 to its open position. The annular flange 85 abuts the annular projection 87 and the closure member 31 abuts the radial surface 79 formed in the wheel hub 9. The second and third O-rings 77, 89 form seals between the wheel hub 9 and the closure member 31 and the base member 29 respectively. The first and second annular chambers 61, 63 are thereby sealed when the valve control assembly 7 is located in the wheel hub 9. The clips 69, 71 locate in the first annular recess 75 formed in the wheel hub 9 to retain the control valve assembly 7 in position. The clips 69, 71 can be displaced radially inwardly to release the control valve assembly 7, as shown by arrows D in FIG. 2.

The fluid pathway through the control valve assembly 7 and the wheel 5 during tyre inflation will now be described with reference to FIGS. 3 and 4. The fluid pathway is illustrated by a sequence of solid lines with arrows denoted generally by reference F. The compressed air is supplied through the supply line 13 and enters the control valve 25 through the inlet port 55. If the control valve 25 is closed, the flow of compressed air through the control valve 25 is inhibited. If the control valve 25 is open, the compressed air travels through the control valve 25 and exits through the outlet port 57 before entering the first and second annular chambers 61, 63.

The second annular chamber 63 is in fluid communication with the wheel valve 39. When the control valve assembly 7 is mounted in the wheel hub 9, the closure member engages the pin 53 and displaces the valve member 43 to its open position. The wheel valve 39 is thereby opened to establish fluid communication between the second annular chamber 63 and the cavity 4 of the tyre 3 via the transfer line 19. The control valve 25 is operable to control the supply of compressed air between the supply line 13 and the tyre 3.

To inflate the tyre 3, the control valve 25 is opened by high pressure air supplied by the compressor C (or by an alternative compressed air reservoir) through the supply line 13. This step is represented by the raising pressure gradient at time t1 in FIG. 5. In particular, the control valve 25 is opened when the supply air pressure exceeds a predetermined threshold. When inflating, the supply air pressure is raised, the control valve 25 opens and air flows into the tyre cavity 4 (interval between times t1 and t2 in FIG. 5). Once the air pressure inside the tyre cavity 4 has reached the desired level (at time t2 in FIG. 5), the supply air pressure is momentarily dropped and then raised above the valve operation threshold briefly (i.e. between times t3 and t4 in FIG. 5, corresponding typically to a time interval of about 0.5 s) before returning to approximately ambient pressure (corresponding to time t4 in FIG. 5). The control valve 25 is thus closed and the tyre cavity 4 is now sealed by the control valve 25.

Deflation requires the supply air pressure to be raised again, briefly, above the valve operation threshold to open the control valve 25 to allow air to leave the tyre cavity 4. The control valve 25 then needs to be operated again, briefly, in the same manner, i.e. by applying a supply air pressure above the valve operation threshold to close the control valve 25 to seal the tyre cavity 4. The pressure of air in the tyre cavity 4 is measured by a tyre pressure monitoring system (TPMS) sensor (not shown) mounted on the wheel rim 11.

Figure 6:
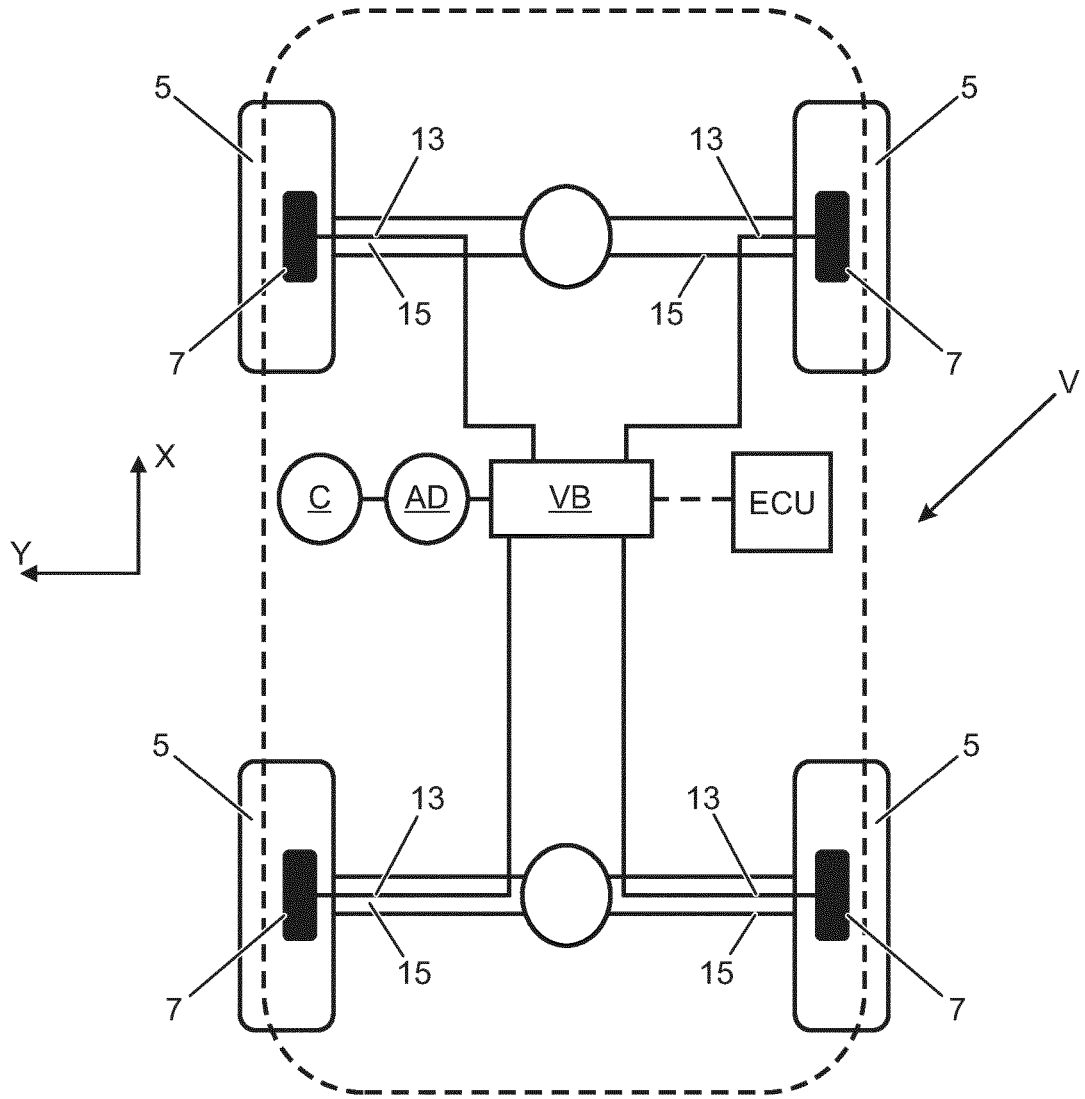
FIG. 6 is a schematic representation of a vehicle equipped with a central tyre inflation system (CTIS) according to an embodiment of the present invention.

As depicted in FIG. 6, the operation of compressor C can be controlled by valve block VB comprising solenoid valves (not shown) actuated by an electronic control unit (ECU). In the present embodiment, the ECU is configured to operate the valve block VB to control the opening and closing of the control valve 25 as described herein. An air dryer AD is provided between the compressor C and the valve block VB. The pressure in each wheel can be controlled independently, or the pressures of the two front wheels can be can be controlled together or the pressures of the four wheels (front and back) can be controlled together.

The operation of the control valve 25 will now be described in more detail with reference to the schematic representations shown in FIGS. 4A to 4D. The latching valve 25 comprises valve means in the form of a poppet valve 84, a poppet spring 86 for loading the poppet valve 84, a piston assembly 88, a piston spring 90 loading the piston assembly 88 and a latch 91. The poppet valve 84 and the piston assembly 88 are arranged co-axially with the rotational axis a-a of the wheel 5 to reduce operational loads, for example centripetal forces caused by rotation of the wheel 5. The latch 91 comprises a rotary latching mechanism which sequentially rotates through first, second, third and fourth position to define different operating modes. The latch 91 is controlled by the air pressure at the inlet port 55. Thus, the supply line 13 functions as a control line for the control valve 25. The operating modes will now be described in sequence.

Figure 4A:
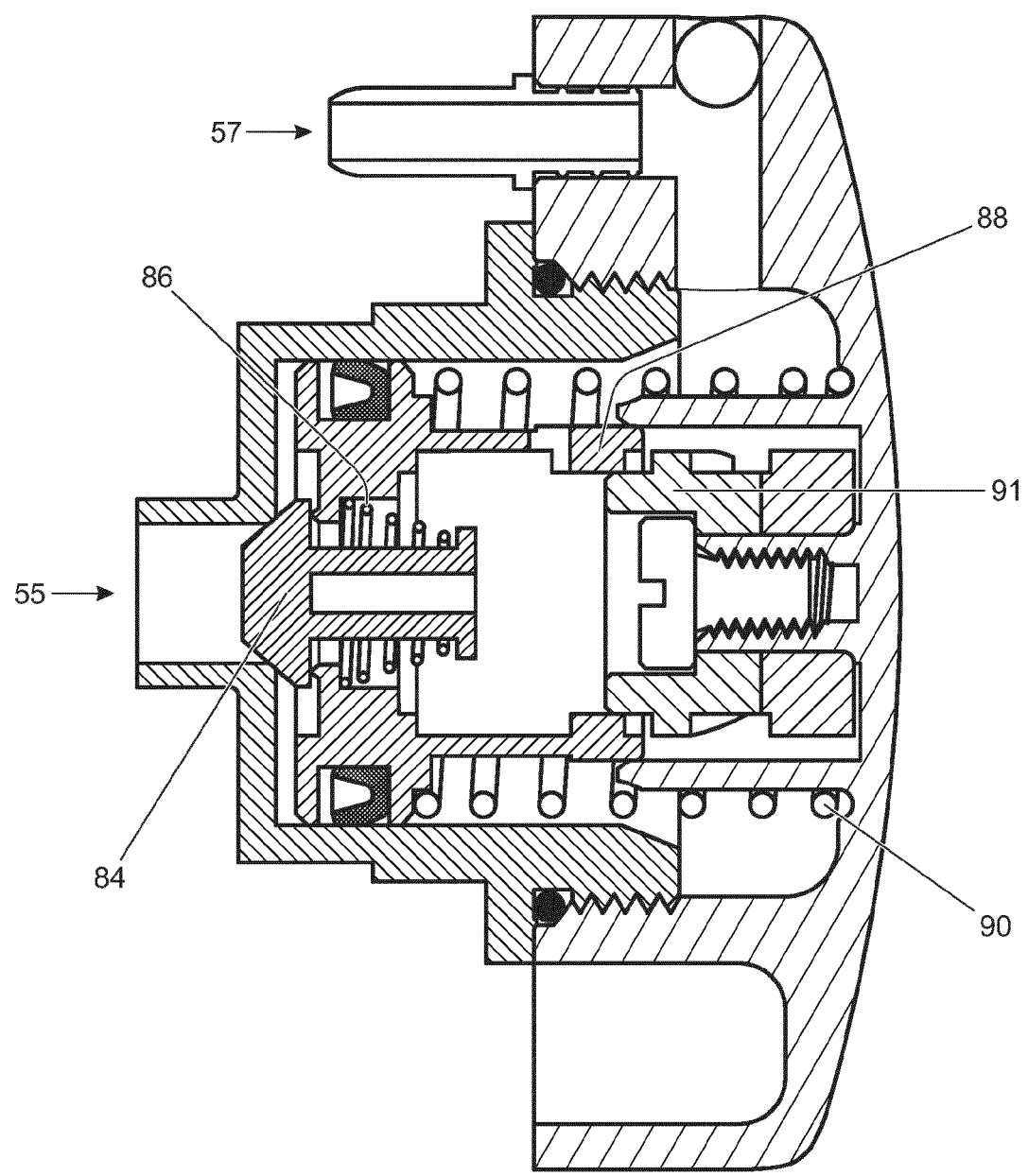
FIGS. 4A-D show schematic representations of a latching valve in the control valve assembly in different operating modes.

During a normal running mode, no compressed air is supplied to the supply line 13 and the pressure in the supply line 13 is substantially equal to, or slightly above, atmospheric pressure. The poppet valve 84 is displaced to its closed position (as shown in FIG. 4A) under the action of the poppet spring 86 and the fluid pressure from the tyre side. The latching valve 25 is closed, thereby maintaining the pressure of the tyre 3. The latching mechanism is in a first position when the latching valve 25 is operating in the normal running mode.

Figure 4B:
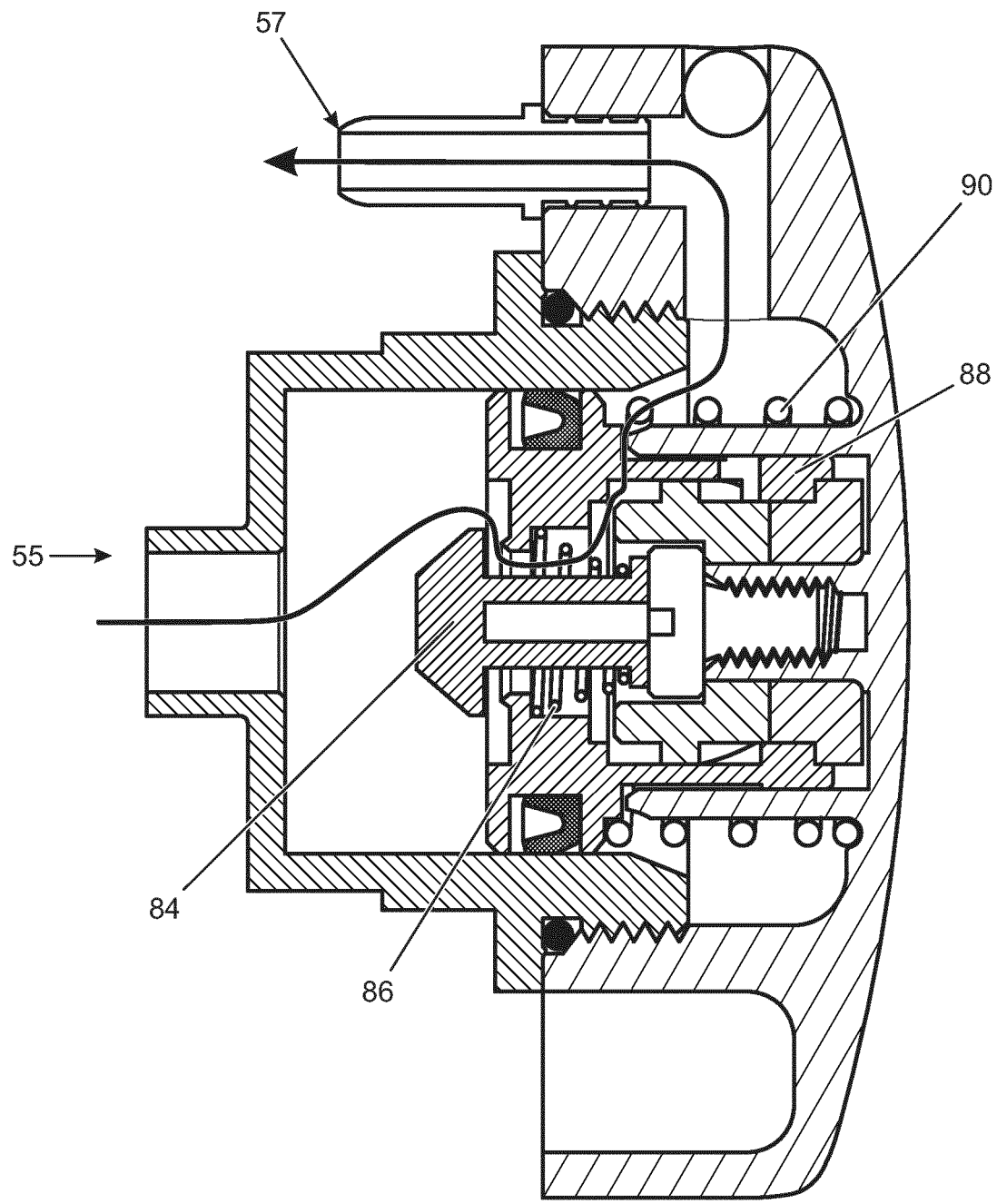
Figure 5:
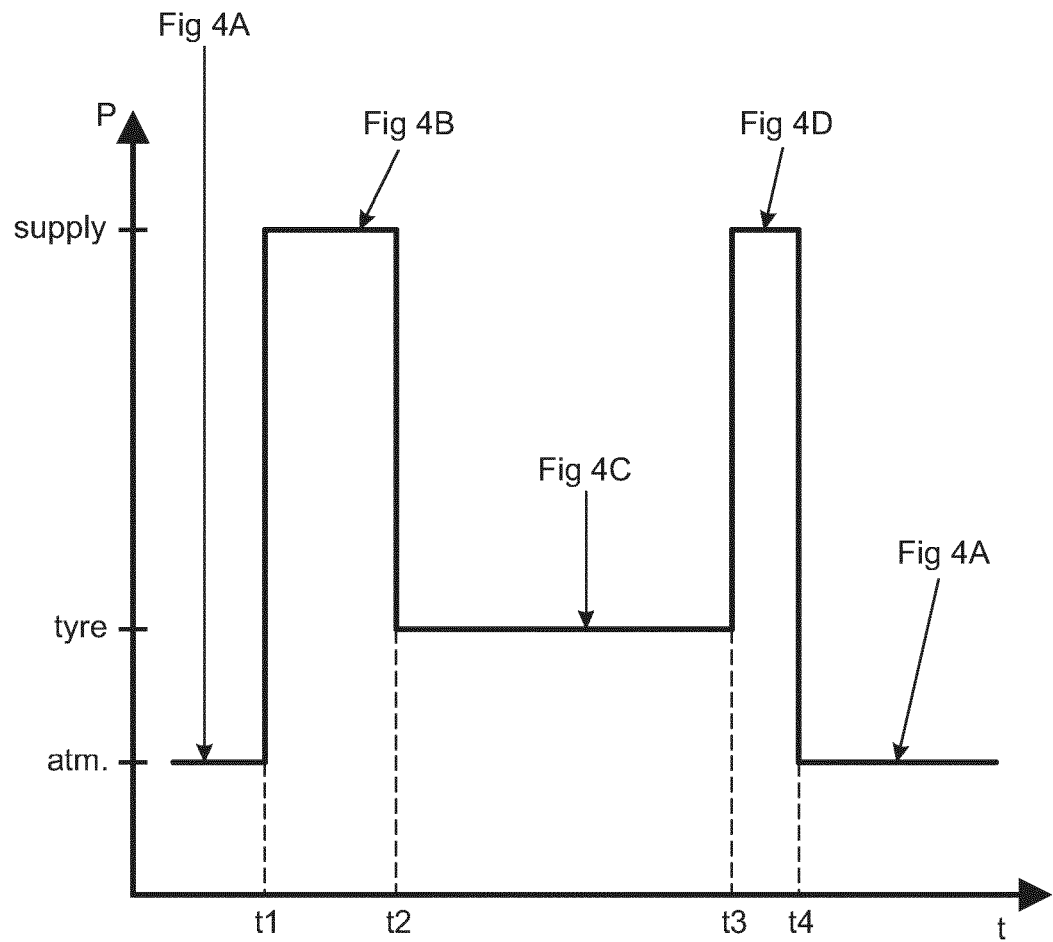
FIG. 5 shows a schematic air supply pressure against time diagram over a cycle of the control valve assembly shown in FIGS. 4A-D.

To operate in an inflate mode, full pressure is supplied to the inlet port 55 of the control valve 25. As shown in FIG. 4B, the piston assembly 88 is displaced against the action of the piston spring 90 (to the right in the illustrated arrangement). The displacement of the piston assembly 88 causes the poppet valve 84 to lift in relation to the piston assembly 88 allowing compressed air to flow through the control valve 25. The tyre 3 can be inflated to a required pressure. The latch 91 rotates to a second position during the inflate mode. As shown in FIG. 5, after the tyre pressure has been adjusted as desired, the poppet valve 84 must be operated again, by supplying full pressure, in order to close the control valve 25, so that the tyre cavity 4 remains sealed.

Figure 4C:
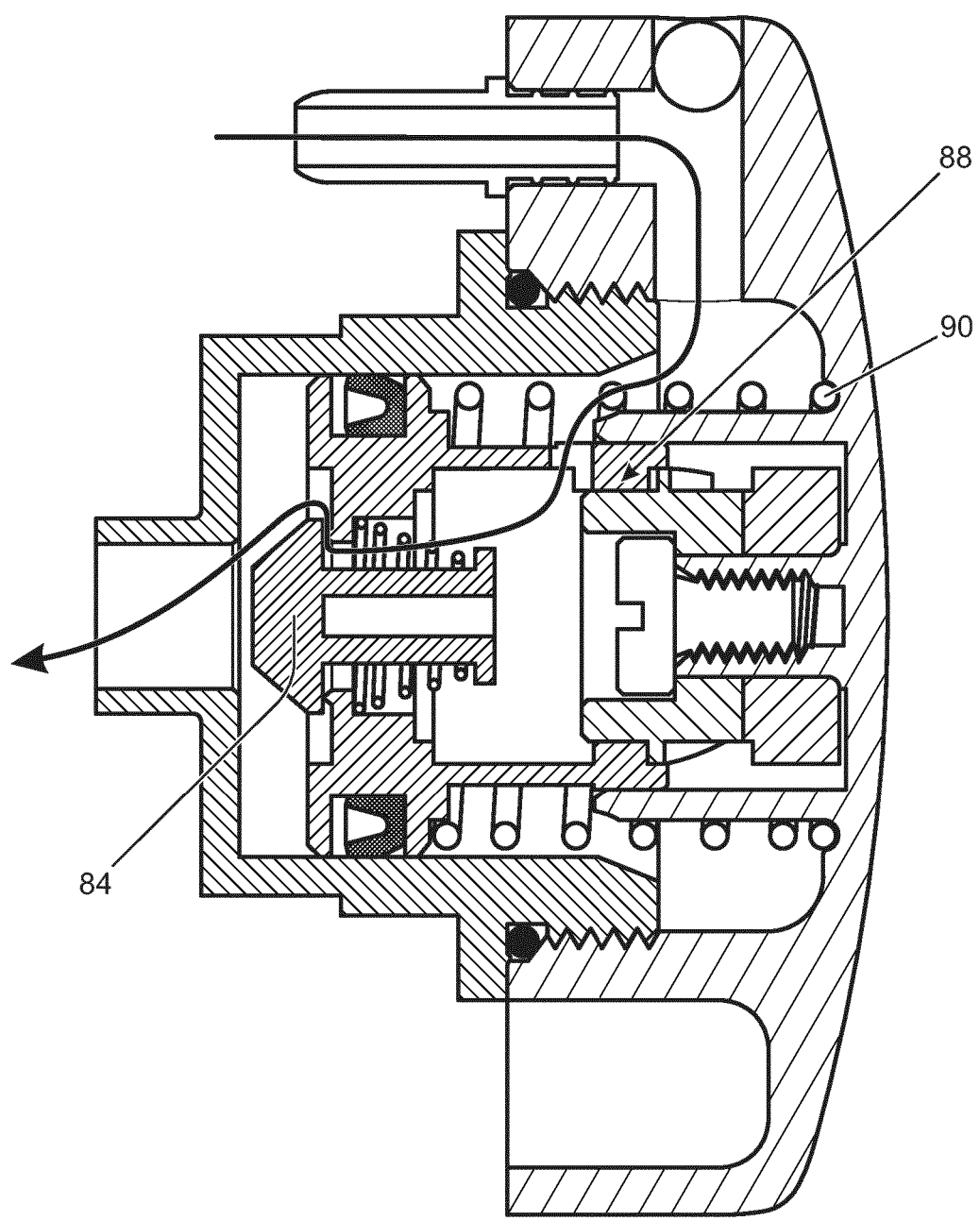
Figure 4D:
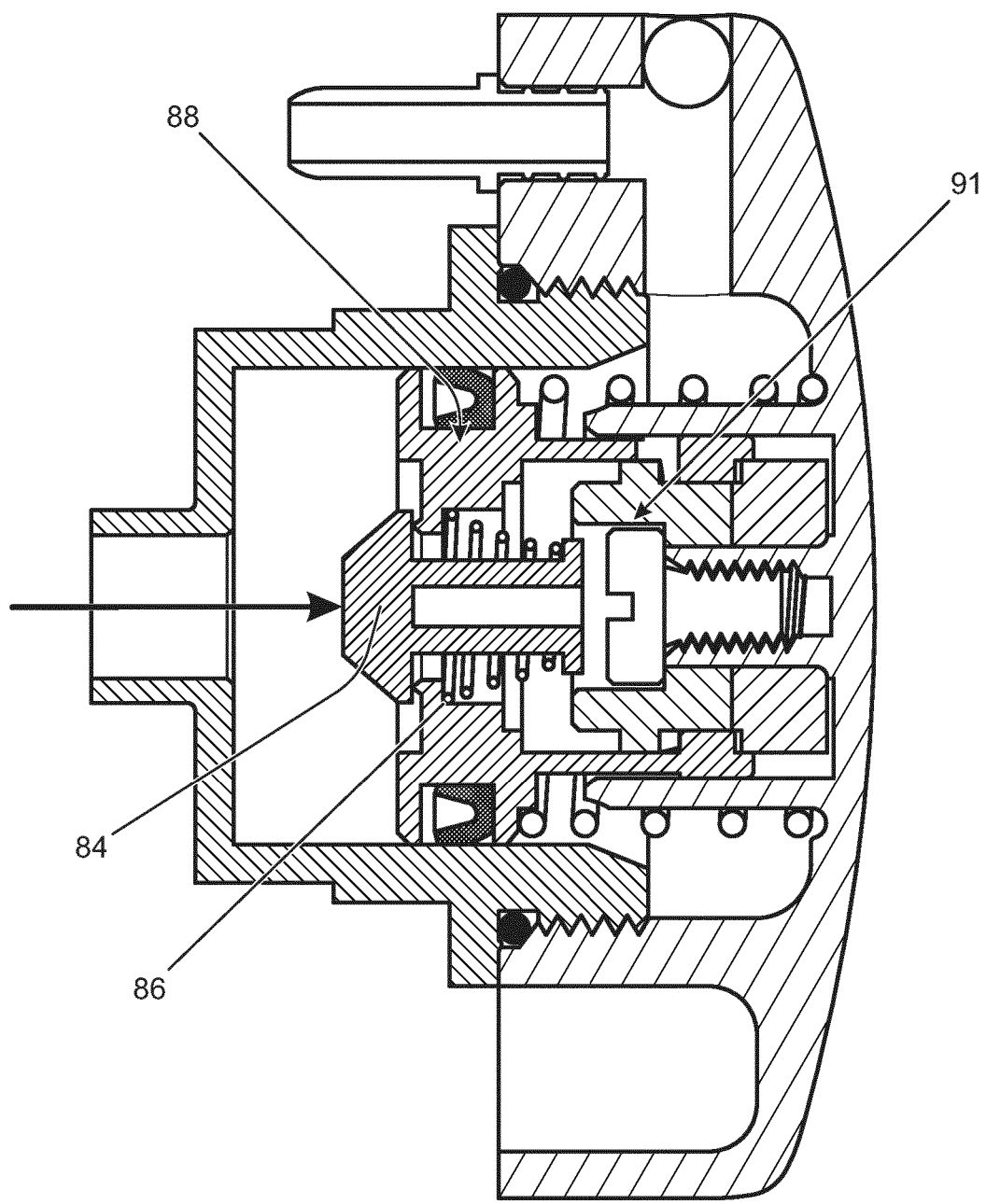

To operate in a deflate/pressure check mode, the poppet valve 84 must be operated again in the same manner, i.e. by supplying full pressure, and then the pressure supplied to the inlet port 55 is reduced to tyre pressure or below. The piston assembly 88 moves under the action of the piston spring 90 (to the left in the illustrated arrangement), but is stopped by the latch 91 and held in an intermediate position, as shown in FIG. 4C. The poppet valve 83 can readily be opened by tyre pressure so the pressure in the tyre 3 can be reduced, if desired. If the supply line 13 is closed, the tyre pressure can be measured. The latch 91 rotates to its third position when the deflate/pressure check mode is engaged.

To reset the latching valve 25, again full pressure is applied to the inlet port 55 and the piston assembly 88 is displaced against the action of the piston spring 90 (to the right in the illustrated arrangement). However, the piston assembly 88 is stopped by the latch 91 and the poppet valve 84 is prevented from lifting from the piston assembly 88. The control valve 25 thereby remains closed throughout the reset operation and the tyre pressure does not change. Finally, the latch 91 rotates to its fourth position in preparation for returning to the normal run mode.

As described herein, the control valve assembly 7 is removably mounted in the hub cavity 37. When the vehicle wheel assembly 1 is installed on the vehicle, the control valve assembly 7 is fixed in position between the wheel hub 9 and the vehicle hub so that it rotates with the wheel when the vehicle in in motion. The control valve assembly 7 can only be removed once the vehicle wheel assembly 1 has been removed. In particular, the vehicle wheel assembly 1 is removed from the vehicle hub by undoing the wheel nuts (or bolts) and lifting the entire wheel assembly 1 off of the mounting bolts. The retaining clips 69, 71 are then squeezed together and released from the first annular recess 75 to enable the control valve assembly 7 to be removed from the wheel hub 9. The control valve assembly 7 is removed axially, along the rotational axis a-a towards the inner side of the vehicle wheel assembly 1. When the control valve assembly 7 is removed, the closure member 31 is lifted clear of the pin 53 and the valve member 43 is displaced to its closed position by the fluid pressure in the tyre 3 and the bias applied by the spring 45. The wheel valve 39 is thereby closed and the transfer line 19 is sealed, inhibiting the venting of air from the tyre 3 to atmosphere. The removal of the control valve assembly 7 facilitates routine maintenance and servicing, for example to replace the tyre 3 and/or balance the vehicle wheel assembly 1. The tyre 3 and the wheel 5 can be serviced according to conventional procedures after the control valve assembly 7 has been removed. Should the wheel 5 be damaged to an extent that the wheel 5 is no longer roadworthy, the wheel 5 can be replaced by any suitable conventional wheel. Vice versa, it will be understood that the wheel 5 can be mounted on any suitable vehicle not equipped with a CTIS, e.g. to replace a conventional wheel.

To assemble the vehicle wheel assembly 1, the control valve assembly 7 is located in the hub cavity 37 and displaced along the longitudinal axis a-a until the retaining clips 69, 71 locate in the first annular recess 75. The closure member 31 engages the pin 53 and displaces the valve member 43 to its open position. The wheel valve 39 is thereby opened and fluid communication established between the tyre 3 and the control valve 25. The second annular chamber 63 maintains fluid communication between the control valve 25 and the transfer line 19 irrespective of the angular orientation of the control valve assembly 7. The retaining clips 69, 71 help to prevent the control valve assembly 7 being displaced out of the hub cavity 37 due to the pressure increase when the wheel valve 39 is opened. The vehicle wheel assembly 1 can then be mounted to the vehicle hub. The nozzle 59 locates in the end of the drive shaft 15 and a seal is formed between the respective surfaces 66, 67. The vehicle wheel assembly 1 is secured in position by the wheel nuts (or bolts) in conventional manner.

Once installed, the control valve assembly 7 is operable to control the supply of compressed air from the compressor to the tyre 3. Specifically, the control valve 25 is operable selectively to open and close the fluid pathway between the supply line 13 and the transfer line 19. In the present embodiment, the control valve 25 is actuated in response to changes in the pressure in the supply line 13. The control valve 25 comprises a latching mechanism which cycles through a sequence of operating modes to provide a normal operating mode; an inflate mode; a deflate/pressure check mode; and a reset mode. The ECU controls operation of the compressor C and/or the associated valve block VB to control the supply of compressed air to the supply line 13 to control operation of the control valve 25. It will be appreciated that the operating sequence of the control valve 25 could be changed with corresponding changes to the control strategy implemented by the ECU.

Although tyre inflation operations have mostly been referred to in the above passages, it will be clear that the present invention can also be used in tyre deflation modes, insofar as an appropriate control valve is used, for example one according to FIGS. 4A to 4D. During tyre deflation, the compressed air from the tyre 3 can be exhausted back through the supply line 13 to a reservoir or to atmosphere. The venting of air from the tyre 3 can be controlled by the valve block VB. Alternatively, the control valve 25 could be configured to vent air from the tyre 3 directly to atmosphere, for example through an outlet port, or the control valve 25 could be configured to return air from the tyre cavity 4 to a bi-directional flow compressor for forced evacuation from the tyre cavity 4 so as to greatly reduce tyre deflation cycle time.

A Schrader valve can be provided for the tyre 3 to provide a separate mechanism for inflating/deflating the tyre 3. The Schrader valve could be provided on the wheel rim 11 or in the hub, for example in communication with a second conduit. The Schrader valve could be positioned diametrically opposite the wheel valve 39 to help balance the wheel assembly 1.

The present invention can be used to take pressurised air made available at the vehicle axle to the tyre 3. In the above passages, we have described: a specifically designed wheel 5; a specifically designed control valve assembly 7, and a vehicle wheel assembly 1 resulting from the assembly of the wheel 5 and the control valve assembly 7.

Figure 7A:
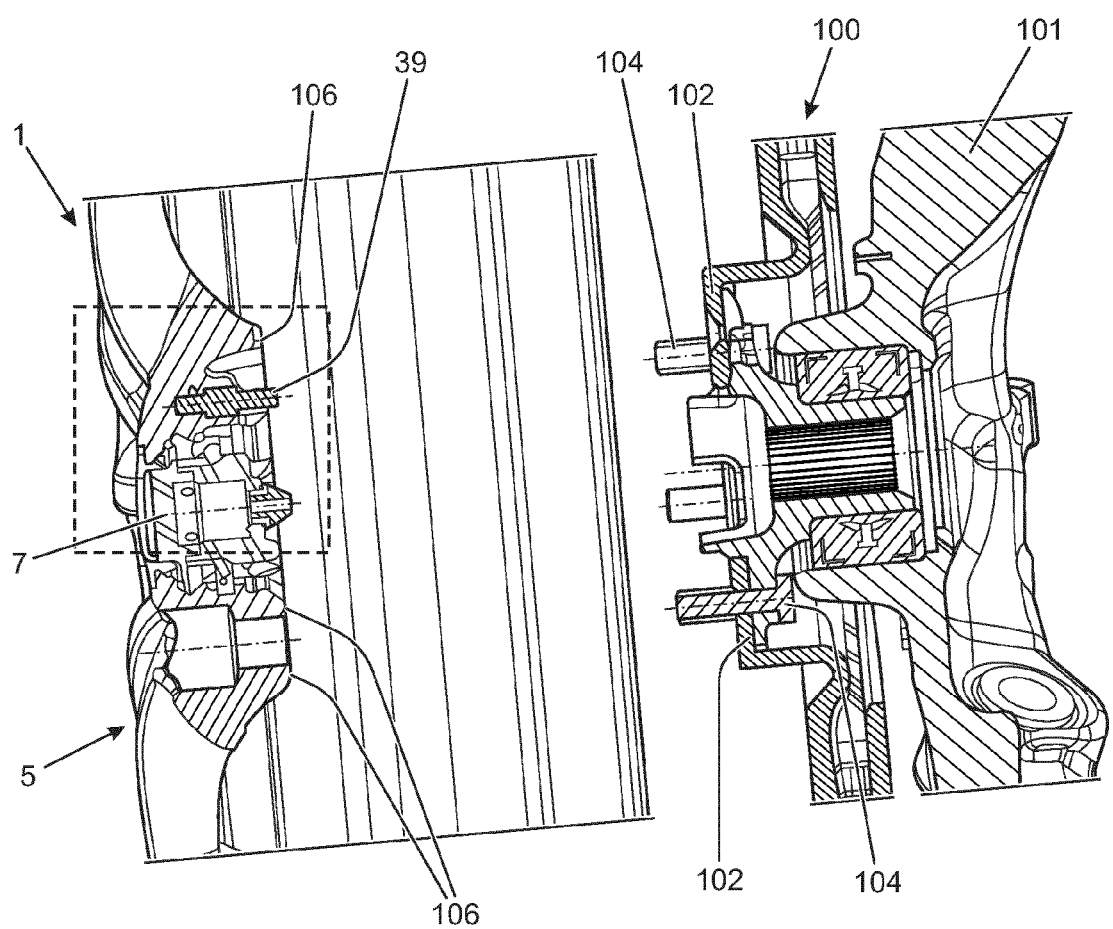
FIG. 7A is a sectional view of a vehicle wheel assembly according to a further embodiment of the present invention and a vehicle wheel hub to which the wheel assembly can be mounted.
Figure 7B:
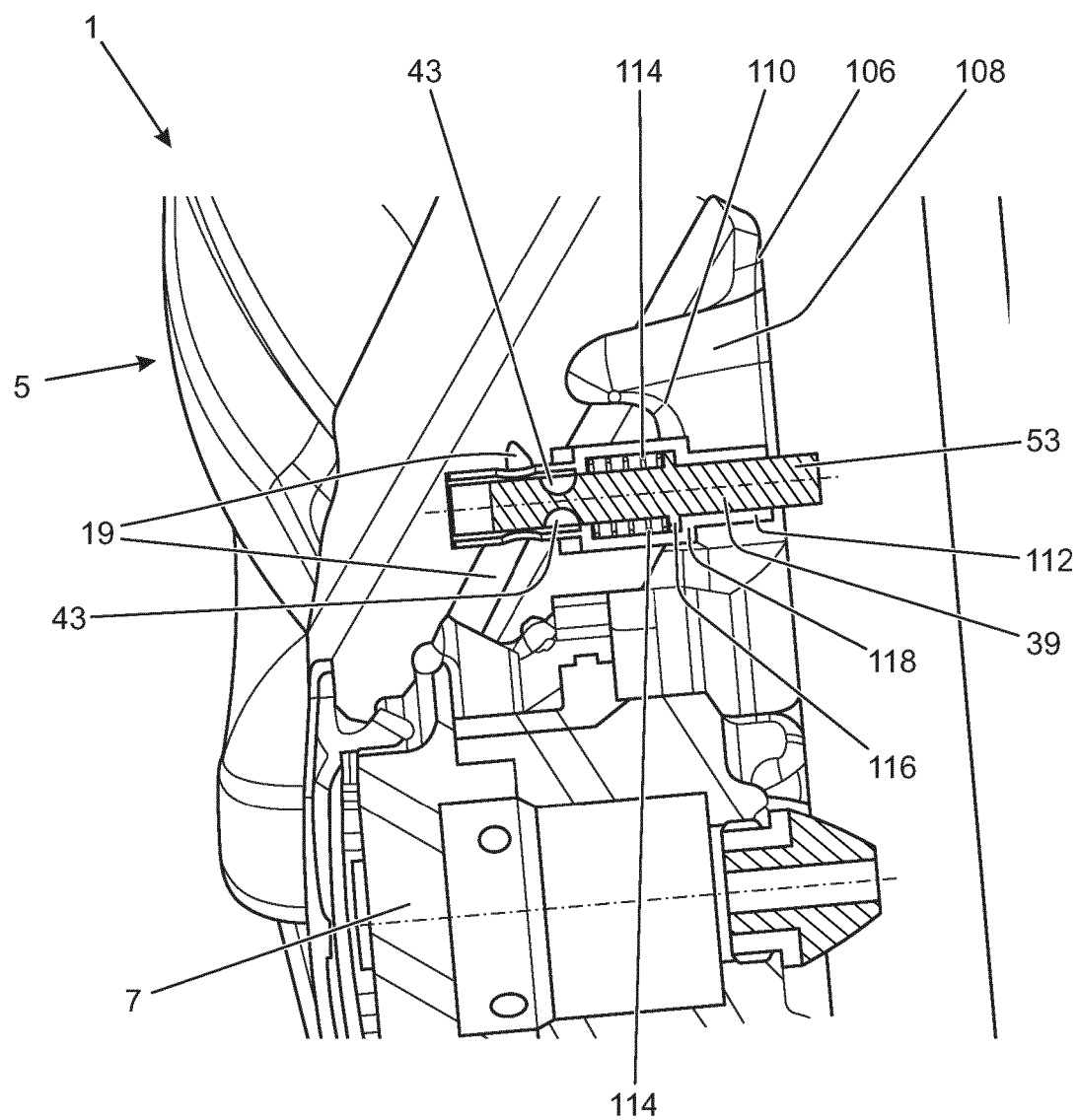
FIG. 7B is a detailed view of the area in dotted outline in FIG. 7A.
Figure 8A:
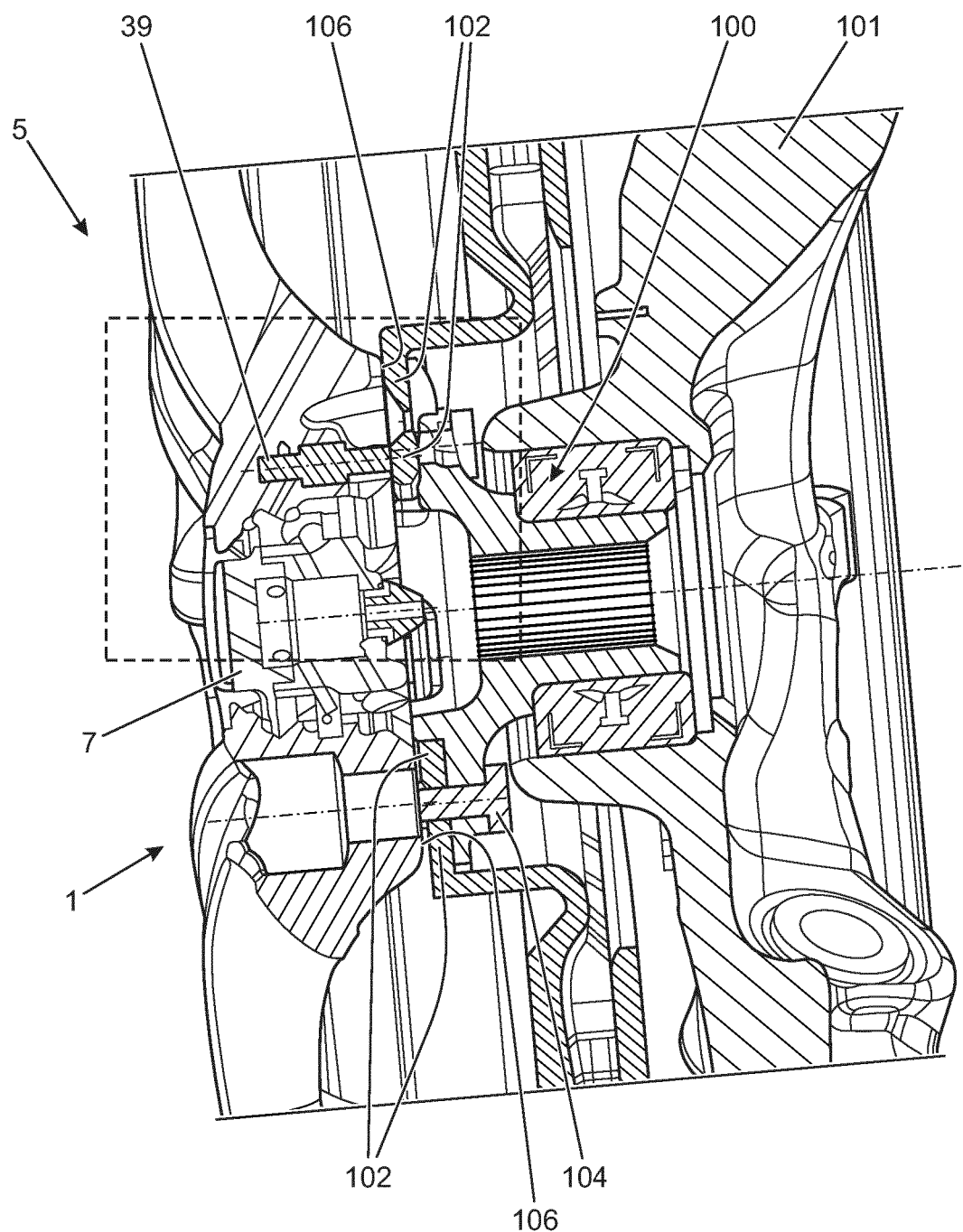
FIG. 8A is a sectional view of the vehicle wheel assembly of FIG. 7 view showing the wheel assembly mounted on the vehicle wheel hub.
Figure 8B:
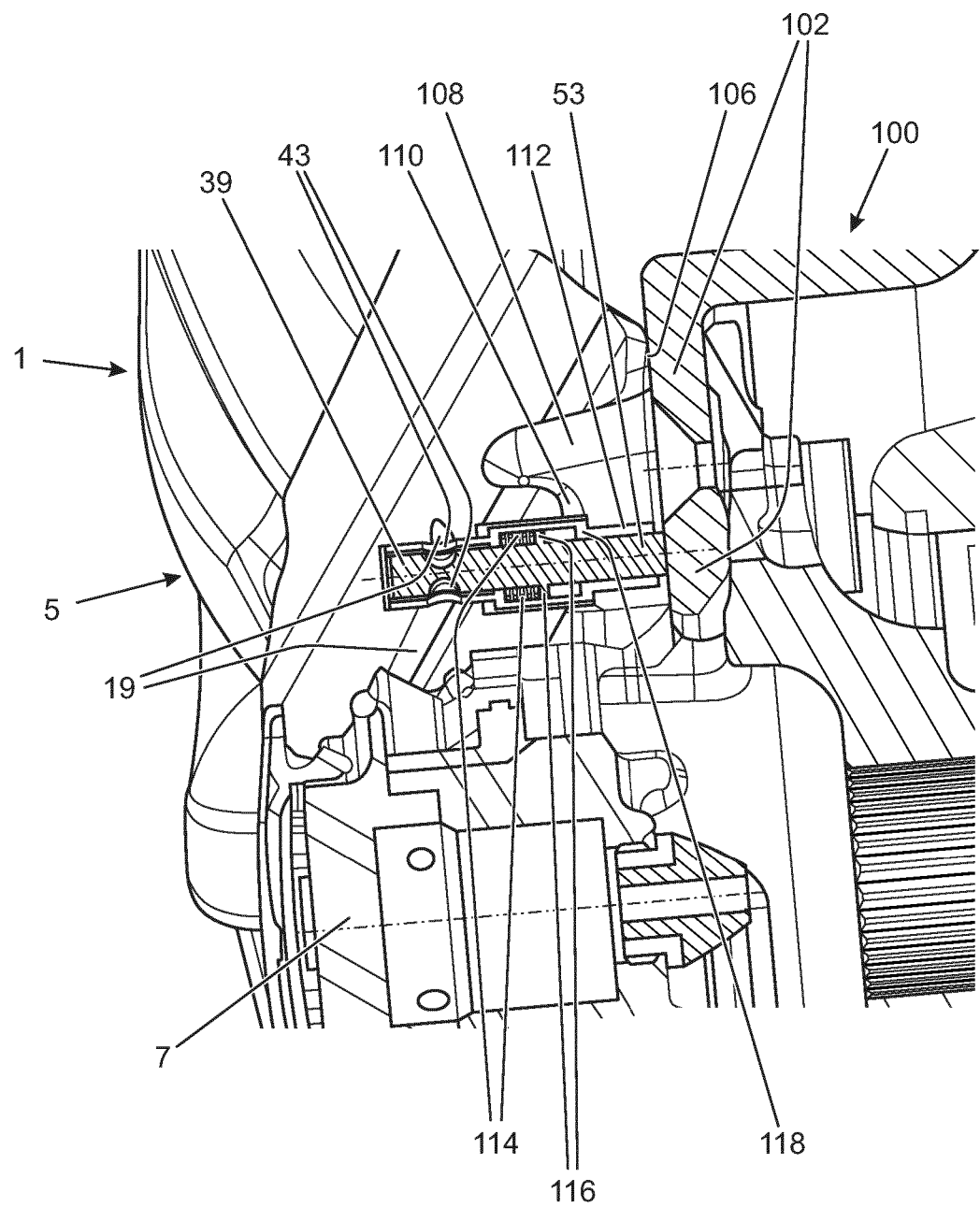
FIG. 8B is a detailed view of the area in dotted outline in FIG. 8A.

In the first embodiment described herein, the in-wheel valve 39 has been provided to stop the tyre from deflating once the control valve assembly 7 is removed. The in-wheel valve 39 is actuated (held in the open state) when the control valve assembly 7 is fitted to the centre of the wheel 5 by means of a mechanical action of a valve pin 53 being pressed down as the control valve assembly 7 is mounted to the wheel 5, thus opening the in-wheel valve 39. The in-wheel valve 39 thereby functions as an isolation valve which closes the transfer line 19 when the wheel 5 and the control valve assembly 7 are removed from the wheel hub, for example for tyre fitting/balancing purposes. In a modified arrangement of the wheel assembly 1, this functionality is preserved but the location of the in-wheel valve 39 is changed. In particular, the in-wheel valve 39 is arranged such that the valve pin 53, which controls operation of the valve member 43, cooperates with the vehicle wheel hub rather than the control valve assembly 7. This modified arrangement, as illustrated in FIGS. 7 and 8, will now be described in more detail.

The vehicle wheel hub assembly 100, in use, is held in a knuckle 101. The vehicle wheel hub assembly 100 conventionally comprises a hub mounting flange 102 having a plurality of threaded studs 104 for mounting the wheel assembly 1. In the embodiment illustrated in FIGS. 7 and 8, the hub assembly 100 includes a brake disc 105, and the hub mounting flange 102 is provided by the brake disc. However, in other embodiments, the vehicle wheel hub may comprise other components which provide the hub mounting flange. In the modified arrangement of FIGS. 7 and 8, the in-wheel valve 39 is positioned radially outwardly of the control valve assembly 7 such that the valve pin 53 engages the hub mounting flange 102. The wheel has a wheel mating surface 106 which abuts the hub mounting flange 102 when the wheel assembly 1 is mounted to the vehicle hub 100. There are recesses 108 in the surface of the wheel 5 which is opposite the hub mounting flange 102 when the wheel assembly 1 is mounted to the vehicle hub 100. The recesses 108 have recessed surfaces 110 which do not abut the hub mounting flange 102. The in-wheel valve 39 comprises a valve housing 112 which surrounds the valve pin 53. The valve housing 112 and the valve pin 53 extend through an aperture formed in a recessed surface 110. The housing 112 extends from the recessed surface 110 a distance short of the wheel mating surface 106, such that, when the wheel assembly 1 is mounted to the vehicle hub 100, the housing 112 does not abut the wheel mating surface 106. The valve pin 53 extends further than the housing 112 such that it protrudes out of the recess 108, beyond the plane of the wheel mating surface 106, when the wheel assembly 1 is not mounted to the vehicle hub 100. The valve pin 53 can be arranged to extend perpendicular to the wheel mating surface 106. In an alternative embodiment, the valve pin 53 may extend through an aperture formed in a wheel mating surface 106 of the wheel 5. In such an arrangement, a valve housing 112 may not be needed. An O-ring or other sealing member can be provided around the valve pin 53 to prevent air loss.

In use, when the wheel assembly 1 is mounted to the vehicle wheel hub assembly 100, the hub mounting flange 102 engages the valve pin 53 and displaces the valve member 43 to its open position. The in-wheel valve 39 is thereby opened when the wheel assembly 1 is mounted to the vehicle hub. Conversely, when the wheel assembly 1 is removed from the vehicle wheel hub 100, the hub mounting flange 102 disengages from the valve pin 53 and the valve member 43 is returned to its closed position under the action of a coil spring 114. The in-wheel valve 39 is thereby closed when the wheel assembly 1 is removed from the vehicle wheel hub 100. The position of the valve pin 53 when disengaged from the hub mounting flange 102 is controlled by a pin protrusion 116 which abuts a stop 118 formed in the housing 112. In this modified arrangement, the removal or fitting of the control valve assembly 7 can be performed without actuating the in-wheel valve 39. The operation of the wheel assembly 1 is unchanged from that of the first embodiment described herein.

It will be appreciated that the in-wheel valve 39 can be actuated by various means, including the fitting of the control valve assembly 7, and/or the fitting of the wheel assembly 1 to the vehicle.

The invention claimed is:

1. A control valve assembly comprising:
    an inlet for receiving compressed air from a supply line;
    an outlet for supplying compressed air to a transfer line; and
    a control valve for selectively placing the inlet in fluid communication with the outlet;
    wherein the control valve assembly is configured to be removably disposed in a wheel hub, and wherein the control valve assembly comprises a housing, the housing defining the inlet and outlet and comprising securing means for releasably securing the housing of the control valve assembly to the wheel hub.

2. A control valve assembly according to claim 1, wherein the control valve comprises a first valve member movable between an open position and a closed position along a longitudinal axis, and wherein the control valve is configured such that, in use, the longitudinal axis is arranged substantially co-axially with a rotational axis of a wheel.

3. A control valve assembly according to claim 1, wherein the control valve is a pneumatically actuated control valve.

4. A control valve assembly according to claim 3, wherein the pneumatically actuated control valve is a latching valve.

5. A vehicle wheel assembly for supplying compressed air to a tire, the vehicle wheel assembly comprising a control valve assembly according to claim 1, and a wheel, the wheel comprising:
    said wheel hub, the wheel hub for mounting the wheel to a vehicle;
    a wheel rim for mounting a tire on the wheel; and
    a transfer line for supplying compressed air to a tire mounted on the wheel.

6. A vehicle wheel assembly according to claim 5, the wheel further comprising a wheel valve for controlling the flow of air through said transfer line.

7. A vehicle wheel assembly according to claim 6, wherein the wheel valve is configured to cooperate with the control valve assembly such that the wheel valve is opened when the control valve assembly is disposed in the wheel hub, and/or the wheel valve is configured to close when the control valve assembly is removed from the wheel hub.

8. A vehicle wheel assembly according to claim 7, wherein the wheel valve comprises a second valve member which is displaced to an open position when the control valve assembly is disposed in the wheel hub.

9. A vehicle wheel assembly according to claim 8, wherein the second valve member is movable along a first axis arranged substantially parallel to, or substantially coincident with a rotational axis of the wheel.

10. A vehicle wheel assembly according to claim 5, wherein the control valve assembly is inserted into the wheel hub from an inner side of the wheel.

11. A vehicle wheel assembly according to claim 10, wherein, when the vehicle wheel assembly is mounted to a vehicle wheel hub, the control valve assembly is disposed between the wheel hub and the vehicle wheel hub.

12. A vehicle wheel comprising:
a wheel hub for mounting the wheel to a vehicle;
a wheel rim for mounting a tire on the wheel;
a transfer line for supplying compressed air to a tire if the tire is mounted on the wheel; and
a wheel valve for controlling the flow of air through said transfer line, wherein the wheel has lateral inner and outer sides, the wheel hub being configured removably to receive a control valve assembly from the inner side of the wheel,
wherein a cavity is formed in said wheel hub for receiving the control valve assembly, the cavity being open towards an inner side of the wheel, and
wherein the wheel valve is configured to cooperate with a housing of the control valve assembly such that the wheel valve is displaced to an opened position in response to the control valve assembly being received in the wheel hub, and/or the wheel valve is displaced to a closed position when the control valve assembly is removed from the wheel hub.

13. A vehicle wheel according to claim 12, wherein the wheel valve comprises a first valve member which is displaced to an open position when the control valve assembly is disposed in the wheel hub.

14. A vehicle wheel according to claim 12, wherein the transfer line is formed in a hollow spoke or in a tube connecting the wheel hub and the rim, wherein the transfer line is in fluid communication at one end thereof with a wheel hub opening and at the other end thereof with a rim opening.

15. A vehicle wheel according to claim 12, wherein the transfer line is in fluid communication at one end thereof with the cavity and at the other end thereof with a rim opening.

16. A vehicle wheel according to claim 12, wherein the cavity comprises an annular recess for receiving securing means of the control valve assembly for securing the control valve assembly when inserted thereinto.

17. A vehicle wheel according to claim 12, wherein the cavity comprises axial retaining means for retaining a control valve assembly inserted into the cavity at a prescribed axial location.

18. A vehicle wheel according to claim 17, wherein the axial retaining means comprises an annular projection extending from an inner surface of the cavity, optionally wherein the cavity defines a circular aperture in the outer side of the wheel hub and the annular projection is disposed at an end of the cavity adjacent to the outer side.

19. A vehicle wheel according to claim 12, in combination with a tire mounted on the wheel rim.

20. A control valve assembly comprising:
an inlet for receiving compressed air from a supply line;
an outlet for supplying compressed air to a transfer line; and
a control valve for selectively placing the inlet in fluid communication with the outlet;
wherein the control valve assembly is configured to be removably disposed in a wheel hub, and wherein the control valve assembly comprises a housing which comprises securing means for releasably securing the control valve assembly to the wheel hub; wherein the housing is adapted to displace a wheel valve of a wheel to an open position in response to insertion of the housing into the wheel hub.

21. A control valve assembly according to claim 20, wherein the housing defines a valve chamber in which the control valve is located.

22. A control valve assembly according to claim 21, wherein the valve chamber is defined by a base member and closure member of the housing; wherein the inlet is formed within the closure member of the housing and the outlet is formed within the base member of the housing; wherein the valve chamber extends circumferentially around the control valve to maintain fluid communication between the inlet and the outlet irrespective of the angular orientation of the base member relative to the closure member.

23. A control valve assembly according to claim 20, wherein the housing comprises one or more clips mounted.

24. A control valve assembly according to claim 20, wherein the control valve comprises a first valve member movable between an open position and a closed position along a longitudinal axis, and wherein the control valve is configured such that, in use, the longitudinal axis is arranged substantially co-axially with a rotational axis of a wheel.

25. A control valve assembly according to claim 20, wherein the control valve is a pneumatically actuated control valve.

26. A control valve assembly according to claim 25, wherein the pneumatically actuated control valve is a latching valve.

27. A vehicle wheel assembly for supplying compressed air to a tire, the vehicle wheel assembly comprising a control valve assembly according to claim 20, and a wheel, the wheel comprising:
said wheel hub, the wheel hub for mounting the wheel to a vehicle;
a wheel rim for mounting a tire on the wheel; and
a transfer line for supplying compressed air to a tire mounted on the wheel.

* * * * *